United States Patent

[11] 3,563,466

| [72] | Inventors | Thomas S. Clark<br>Saratoga;<br>William S. Kennedy; Gerald E. Kuskie, San Jose, Calif. |
|---|---|---|
| [21] | Appl. No. | 802,085 |
| [22] | Filed | Feb. 25, 1969 |
| [45] | Patented | Feb. 16, 1971 |
| [73] | Assignee | the United States of America as represented by the Secretary of the Air Force |

[54] ROCKET MOTOR THRUST VECTOR CONTROL SEAL
3 Claims, 3 Drawing Figs.

[52] U.S. Cl. ................................................. 239/265.15,
239/265.17, 239/265.23
[51] Int. Cl. ........................................................ B64d 33/04
[50] Field of Search ............................................ 239/265.15,
265.17, 265.23, 127.3; 60/231

[56] References Cited
UNITED STATES PATENTS
3,132,476  5/1964  Conrad ........................ 239/265.17

| 3,229,635 | 1/1966 | Oss .............................. | 239/265.15X |
| 3,300,978 | 1/1967 | Pennington ................... | 239/265.23 |
| 3,351,691 | 11/1967 | Wilford ........................ | 239/265.15X |
| 3,427,698 | 2/1969 | Guzewicz ..................... | 239/265.15X |
| 3,465,966 | 9/1969 | Fuentes et al ................ | 239/265.17 |
| 3,465,967 | 9/1969 | Card ............................. | 239/265.23 |

*Primary Examiner*—Lloyd L. King
*Attorneys*—Harry A. Herbert, Jr. and Ruth G. Codier ABSTRACT: A thrust vector control seal assembly including a tube which fits within the injection port of a rocket motor fluid-injection thrust vector control system and carrying at its inner end, a deformable stainless steel ring that positions the tube and provides frictional torque during assembly. The seal assembly also carries a disposable cap on its outer end providing a seal for the port, preventing fluid passage until it is removed and an insulating liner to protect the tube from the rocket exhaust. Removal of the seal takes place only after predetermined conditions have been met. The necessary condition is the ignition of the solid fuel rocket motor. Other conditions may be a preset time delay determined by conditions of heat and pressure.

PATENTED FEB 16 1971  3,563,466

INVENTORS.
THOMAS S. CLARK
WILLIAM S. KENNEDY
BY GERALD E. KUSKIE

ATTORNEYS

ROCKET MOTOR THRUST VECTOR CONTROL SEAL

BACKGROUND OF THE INVENTION

This invention relates to a rocket motor thrust vector control system seal and, more particularly, the invention is concerned with providing a pyro-seal which prevents fluid passage until predetermined conditions have been met. The launching of a rocket and in insuring availability of injectant fluid at the precise time to insure steering authority prior to booster lift-off is a complicated operation under the highest optimum conditions. Attempts have been made to provide a seal that will remain effective as a seal during handling and launching operations but which will be removed automatically and positively and insure availability of injectant fluid when the critical moment during launching has arrived.

The problems in providing such a seal may arise from the complicated mechanisms which may fail entirely or become effective for removing the seal too early or too late.

FIG. 1 of the drawing is an example of some of the devices that have been tried. A valve 20' which metered fluid under high pressure made fuel available only after the ejection of the nozzle seal 25, the support 26' the spacers 27, and the fluid retainer 29. This prior art device, which exemplifies the problems, was unsatisfactory because of the many parts required, and the complexity of the ejection operations.

SUMMARY OF THE INVENTION

The present invention relates generally to a pyro-seal, and more particularly to a sealing device for controlling the time of initial injection at the injection ports of the rocket motor.

The object of the invention is, therefore, to provide a simple and dependable method of sealing the fluid injection thrust vector control system of a solid rocket motor nozzle which will overcome the problems noted above. Activation or removal of the seal described herein cannot take place until certain conditions of temperature and pressure are reached after motor ignition and/or a preset time delay has taken place.

A further object of the invention is the elimination of uncertainty and hazards from rocket motor launchings by the provision of a seal which functions only after the mentioned conditions have been reached.

A further object of the invention is the effective control of all leakage paths. In the device of the invention all such leakage paths are independent and thereby easily isolated. It is of prime importance that leakage in all areas be prevented because such leakage is hazardous to personnel and is endangering to any intended mission. Specifically, $N_2O_4$ systems can be stoppered by the use of the hereinafter described seal assembly.

Further, the pyro-seal provides a prelaunch seal located downstream of the last active component thereby producing the efficient procedure of utilizing the feedlines as storage space for injectant and functions independently of all solid rocket motor airborne and ground equipment. Activation requires only pressure in the fluid injection thrust vector control system and solid rocket motor ignition.

These and other advantages, features and objects of the invention will become more apparent from the following description taken in connection with the illustrative embodiments in the accompanying drawings, wherein:

DESCRIPTION OF THE PREFERRED EMBODIMENT

The seal according to the invention includes a tube and end-cap assembly which is inserted in each injection port of the rocket motor nozzle exit cone during the assembly of the device and prior to the assembly of the injectant valve. The seal is clamped in place when the injectant valve is assembled.

Figure 2:
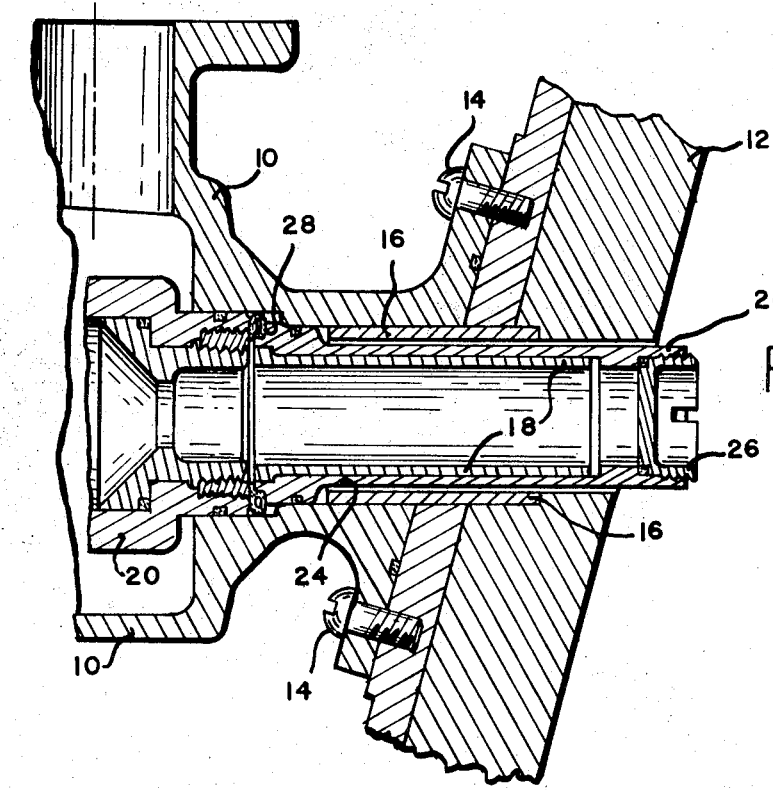
FIG. 2 is a cross-sectional view of the fluid injection nozzle and seal according to the invention.
Figure 1:
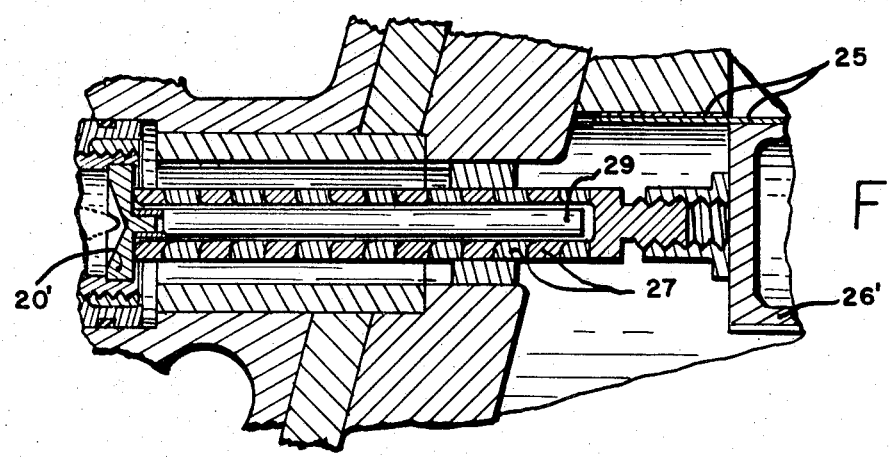
FIG. 1 is a cross-sectional view of the device showing the state of the art.

Referring not to the drawing of FIG. 2, a valve housing 10 is secured to a nozzle casing 12 by screws 14 or other expedient means. The port hole passing through these elements is provided with a double lining 16 and 18. The elements 16 and 18 are of phenolic, or comparable material, such as glass, cloth, or resin capable of providing a heat barrier. The tubular portion or extension tube 24 of the sealing assembly lies between the lining elements 16 and 18.

A deformable seal-ring 28 of stainless steel is installed in a recess in the outer end of the tube 24 and lies between the valve 20 and the tube 24, preventing relative rotation of the tube 24. It serves two unique purposes: (1) It secures the tube 24 in place longitudinally and (2) It provides, by design, sufficient frictional torque to counter any tendency of the extension tube to rotate when the end-cap 26 is being installed, eliminating the necessity for special tools (such as a spanner wrench or a strap wrench) for completing the assembly.

The tube 24 and the end-cap 26 are of aluminum, or may be steel, wax or plastic of a designed stress level to fail at a predetermined point. The invention is of course not limited to any specific material, or in fact, any specific design of the cap 26 or the tube 24.

The seal is "activated," that is to say failure of the tube 24 and of the cap 26 occurs only after motor ignition has taken place and when the hot high velocity exhaust gases from the motor impinge upon the end-cap 26 and the end of the tube 24 causing their failure by erosion and/or material failure. The injection port is thus opened and made available for the normal steering function of the system. The end-cap 26 is very light and is swept away by the motor exhaust without causing any damage.

The device was found under test to be capable of seal-activation and complete port opening within 300 milliseconds after motor ignition, insuring steering capability before lift-off.

Although the invention has been described with reference to a particular embodiment, it will be understood to those skilled in the art that the invention is capable of a variety of alternative embodiments within the spirit and scope of the appended claims.

We claim:

1. A seal for a rocket motor nozzle thrust vector control comprising a valve casing lying adjacent said nozzle, said nozzle and said valve casing having a continuous port therethrough for entrance of injectant from an injectant supply to the rocket motor nozzle, a valve for controlling the flow of injectant to said port, a seal assembly independent of said valve for sealing the inner end of said port until predetermined conditions are reached for its opening, said seal assembly comprising a destructible tube extending through said port into the rocket motor nozzle, and a destructible end-cap secured to the inner end of said destructible tube, said tube and end-cap being designed to fail under predetermined conditions of heat and pressure.

2. In a seal as claimed in claim 1, a deformable steel ring installed at the inner end of said seal assembly for positively locating said seal assembly and clamping it in place during its installation.

3. In a seal as claimed in claim 1, a pair of heat-resistant lining elements comprising an outer lining element and an inner lining element, said assembly tube being positioned between said inner lining element and said outer lining element.